United States Patent [19]

Levin

[11] Patent Number: 4,698,687
[45] Date of Patent: Oct. 6, 1987

[54] TEMPERATURE CONTROL OF LIGHT MODULATING FLUID IN A LIGHT VALVE PROJECTION SYSTEM

[75] Inventor: Sherman L. Levin, Williamsville, N.Y.

[73] Assignee: General Electric Company, Princeton, N.J.

[21] Appl. No.: 816,599

[22] Filed: Jan. 6, 1986

[51] Int. Cl.$^4$ .............................................. H04N 5/66
[52] U.S. Cl. ..................................... 358/230; 358/233
[58] Field of Search ................. 358/230, 62, 233, 234, 358/231, 60; 350/361, 360

[56] References Cited

U.S. PATENT DOCUMENTS

| | | |
|---|---|---|
| 3,277,241 | 10/1966 | Spencer .............................. 358/230 |
| 3,291,907 | 12/1966 | Glenn, Jr. ........................... 358/233 |
| 4,533,216 | 8/1985 | Orser et al. ......................... 358/233 |

Primary Examiner—Tommy P. Chin
Assistant Examiner—David E. Harvey
Attorney, Agent, or Firm—Eugene M. Whitacre; Vincent J. Coughlin, Jr.

[57] ABSTRACT

A light valve projector system having an improved apparatus for heating the light modulating fluid. The light modulating fluid is heated with near infra-red radiation which passes though the enclosing glass envelope and which is absorbed by the light modulating fluid.

10 Claims, 5 Drawing Figures

TEMPERATURE CONTROL OF LIGHT MODULATING FLUID IN A LIGHT VALVE PROJECTION SYSTEM

FIELF OF THE INVENTION

The present invention generally relates to light valve projection systems employing a deformable transparent light modulating medium which diffracts incident light to form projected images in accordance with the modulating information.More particularly, the invention relates to such systems in which the light modulating medium is a fluid overlying a disk and information is written by an electron beam which scans out a raster on the fluid and forms diffraction gratings which control light rays transmitting the superimposed information. In more specific terms, this invention relates to heating and maintaining the temperature of the light modulating fluid in a light valve projector. Temperature control of the light modulating fluid is necessary in order to provide the correct viscosity and light transfer characteristics for proper operation of the light valve projector.

DESCRIPTION OF THE PRIOR ART

The general principles and mechanisms of light valve projectors are described in U.S. Pat. No. 3,437,746 issued to Good et al. In light valve projectors of this type, the light modulating fluid must be brought to and maintained at a very specific temperature in order to act as an efficient light modulation control layer for television image transmission. The critical relationships of fluid temperature (which controls viscosity), fluid depth, the television field rate and the electrical and mechanical response rates are shown in FIGS. 11 and 12 of the Good et al patent. This patent also describes other important relationships concerning characteristics of the fluid used as a control layer. A series of light modulating fluids has been developed to meet these needs, and all operate in a temperature range of 40° to 65° C. Specific examples of such fluids are disclosed in U.S. Pat. Nos. 3,288,927 issued to Ralph E. Plump, U.S. Pat. Nos. 3,317,664 and 3,317,665 issued to Edward F. Perlowski, Jr., U.S. Pat. No. 3,541,992 issued to Carlyle S Herrick et al, and U.S. Pat. No. 3,761,616 issued to C. E. Timberlake. These fluids may include additives as taught by U.S. Pat. Nos. 3,764,549 and 3,928,394 issued to David A. Orser. In general, the light modulating fluid is a very special chemical compound, modified with specific additives, having the electro-mechanical and visco-elastic properties needed to produce effective control layer properties in the electron-beam addressed light valve.

For many reasons, the high vacuum light valve enclosure is contructed of glass. In the prior art devices, electrically powered, flexible resistance heater mats have been used to heat the fluid from an ambient temperature of about 20° C. to the desired operating temperature of about 60° C. These devices are attached to the outer surface of the light valve envelope consisting of that part of the rear housing and face plate that compose the sump for the light modulating fluid. These resistance heater mats depend upon conduction of the heat through the glass envelope, but since both the glass envelope and the light modulating fluid are poor thermal conductors, this provides only a slow rate of heat transfer into the light modulating fluid and requires raising the temperature of the heater to a value which is far in excess of the desired temperature of the fluid. The process is limited in rate of temperature rise by the thermal stress limits of the glass envelope and the glass frit seal materials which bond the rear housing to the face plate. As a result, a typical heating cycle from an ambient temperatue of 20° C. might require forty minutes to achieve the 60° C. operating temperature of the light modulating fluid without over stressing the glass components of the envelope. The differential temperature distribution of the glass has been the basic limitation on the power that could be used to speed up the process. Moreover, when the fluid finally reaches its operating temperature, the temperature may then still rise further because of the excess heat present in the heating device which has a higher tempera.ture than the fluid. In addition, changes in the temperature of the light modulating fluid, as may be required by changes in the television frame rate or to achieve a change in other temperature related parameters, have been difficult to achieve rapidly due to the long conduction heating response time of the thermal system. What is needed is a means of heating the light modulating fluid rapidly and efficiently to reduce the initial warm-up time without causing glass failures and then controlling the temperature of the light modulating fluid within a very limited range, typically 0.5° C., once it has achieved a desired operating temperature.

SUMMARY OF THE INVENTION

It is therefore an object of this invention to provide an apparatus for heating the light modulating fluid in a light valve projection system which is faster and more controllable in operation than that heretofore used.

It is another object of the invention to provide a technique for heating and controlling the temperature of the light modulating fluid in a light valve projection system which requires a minimum amount of power and is inexpensive yet highly reliable.

It is a further object of the invention to provide a way of heating the light modulating fluid in a light valve projection system which reduces the thermal stresses in the glass envelope of the light valve and also reduces undesirable thermal degradation in the fluid by minimizing thermal overshoot.

According to my invention, a source of infra-red heating rays is placed outside of the glass enclosure and proximate to the light modulating fluid. I have analyzed the transmission of radiant energy through the glass envelope and the light modulating fluid materials used in light valve projectors, and I have found that radiation in the visible and near infra-red region is transmitted by the glass while being absorbed by the fluid. Based on the measured results of heat absorption by the fluid within particular wavelengths of radiant energy, I calculated the energy which would be needed to raise the fluid temperature to the 60 C. operating temperature and found that the fluid mass could easily be heated by radiant energy with a minimum input power. Incandescent lamp sources were obtained and used to irradiate the fluid through the glass envelope of the light valve projector in a series of tests to prove the validity of this concept. The tests demonstrated conclusively that the invention provides a way to rapidly heat the light modulating fluid to a desired operating temperature without producing thermal stress in the glass envelope. Moreover, the rapid thermal response time allows more precise control of the operating temperature and the ability to change the operating temperature when a change in operating conditions of the light valve projector requires it.

This invention provides for more accurate control of the light modulating fluid temperature because the infra-red source can be turned off when the fluid reaches the desired temperature and because there is very little thermal mass in the system which will continue to supply heat to the fluid. Additional control may be provided through the focusing of the infra-red radiation upon portions of the fluid where heat is best utilized. Direction of the infra-red light may be accomplished by the use of lenses, mirrors, or by the use of fiber optic elements. In addition, a plurality of infra-red light sources may be used to provide more uniform and controlled heating to the light modulating fluid.

The infra-red source in accordance with this invention may be a narrow band source which provides radiation in the near infra-red spectrum, or a broad band source combined with a filter which removes the visible portions of the spectrum. Through focusing and filtering, the visible portions of the light from the infra-red or broad band source may be positioned such that the visible portion of the spectrum does not interfere with the writing surface. This prevents radiant interference from the heating source which might otherwise show up in the projected image upon the screen.

BRIEF DESCRIPTION OF THE DRAWINGS

The foregoing and other objects, aspects and advantages of the invention will be better understood from the following detailed description of the preferred embodiment of the invention with reference to the drawings in which.

DETAILED DESCRIPTION OF THE PREFERRED EMBODIMENTS OF THE INVENTION

Figure 1:
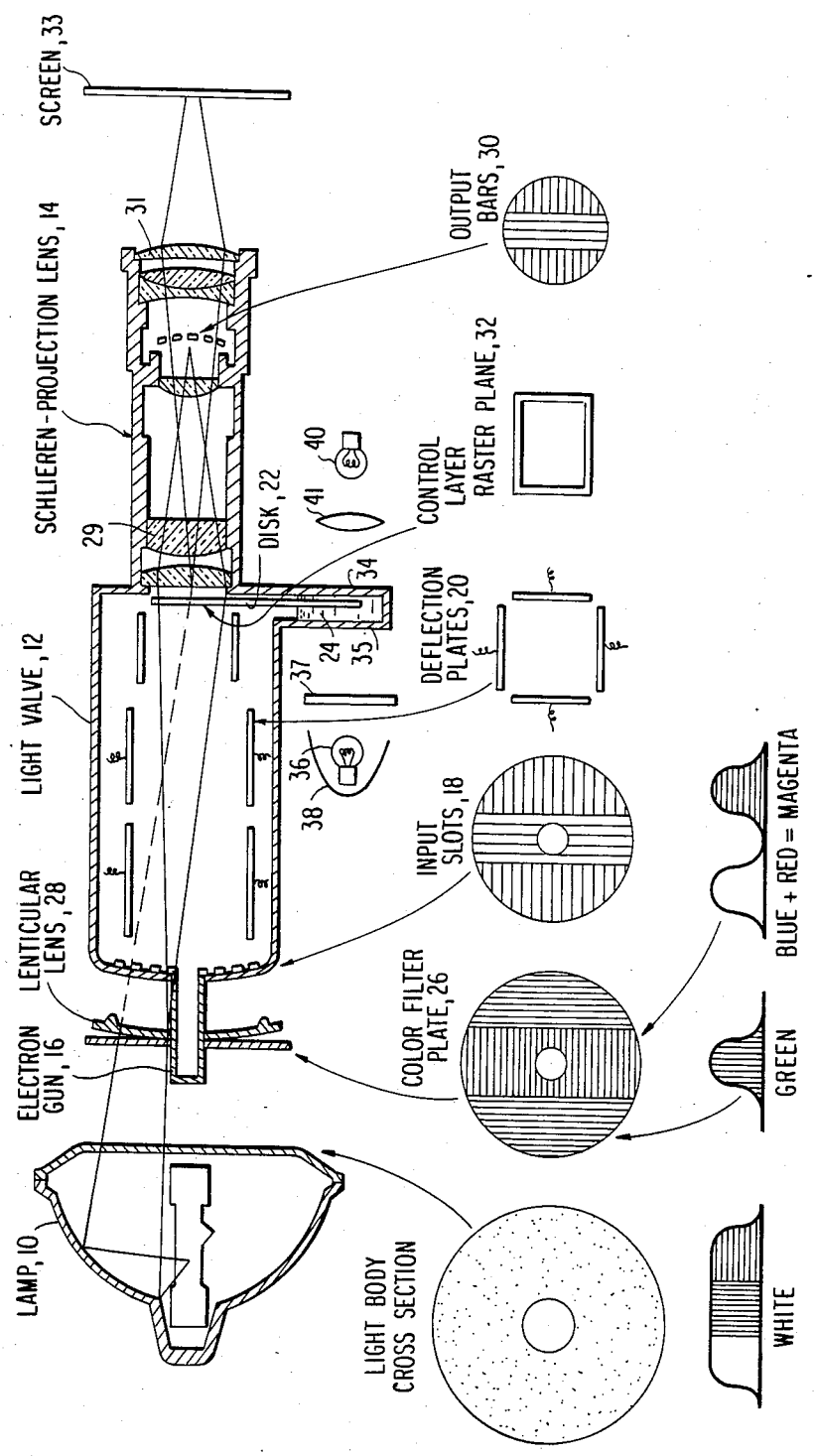
FIG. 1 is a simplified cross-sectional view of a light valve projector incorporating an infra-red light modulating fluid heating source.

Referring now to FIG. 1 of the drawings, there is schematically shown a single-gun color television light valve projection system comprising a xenon lamp 10, a sealed light valve 12, and a schlieren projection lens 14. The sealed light valve 12 contains the electron gun 16, input slots 18, deflection plates 20, the rotating disk 22 on which is deposited the control layer of light modulating fluid, and the fluid reservoir 24. The light from the lamp 10 is projected through a color filter plate 26 and a lenticular lens 28 before entering the light valve 12. The schlieren projection lens 14 includes schlieren lens 29, output color selection bars 30 and a projection lens 31. The lower half of FIG. 1 shows the cross sections of the light body and light valve. The spectral diagrams at the bottom indicate how the light may be prefiltered before entering the light valve.

In one embodiment of the light valve projection system shown in FIG. 1, green light is passed through the horizontal slots of the input bar plate 18 and is controlled by modulating the width of the raster lines on the control layer 32. This is done by means of a high frequency carrier applied to the vertical deflection plates and modulated by the green video signal. Magenta (red and blue) light is passed through the vertical slots of the input bar plate 18 and is modulated by diffraction gratings created at right angles to the raster lines by velocity modulating the electron spot in the horizontal direction. This is done by applying a 16 MHz (12 MHz for blue) signal to the horizontal deflection plates and modulating it with the red video signal. The grooves created in the control layer 32 have the proper spacing to diffract the red portion of the spectrum through the output slots in plate 30 while the blue portion is blocked. For the 12 MHz carrier, the blue light is passed by the slots 30 and the red is blocked. Thus, three simultaneous and superimposed primary color pictures are written with the same electron beam and projected to the screen 33 as a completely registered full color picture. Colors are created by writing miniature diffraction gratings within each picture element on the fluid surface by manipulating the single scanning electron beam. These gratings break up the transmitted light into its spectral colors which appear at the output bars where they are spatially filtered to let the desired color reach the screen. This technique permits a full color television picture to be written on a single control layer with no need for further registration.

As may be appreciated, the light modulating fluid is critical to the proper operation of the light valve projection system. This fluid must be brought to and maintained at a very specific temperature range in order to act as an efficient light modulation control layer for television image transmission. The use of electrically powered resistance heating mats attached to that portion of the glass envelope which forms the reservoir 24 has been the practice for over twenty years. This approach has worked, but it has serious drawbacks which have already been discussed. Conduction heating is inherently not a particularly effective method of heating the light modulating fluid. Glass, when required to transmit heat by conduction, is a relatively good thermal insulator. In areas not wetted by the fluid, vacuum, in series with the glass, is also a good thermal insulator. Even where fluid is in contact with the glass, heat transfer is not especially good since the fluid itself is a poor heat transfer medium. The net effect is that, in order to heat the fluid, the heaters must be driven to a temperature substantially higher than that desired for the fluid operating temperature. Alternate heating means involving direct conduction from an internal heater have been considered. There has been much concern among those involved in light valve fabrication regarding introduction of anything inside the glass envelope. Their concerns included problems in making a glass-to-metal seal with sufficient integrity and the introduction of new sources of particulates or impurities into the light valve and its modulating fluid.

Figure 2:
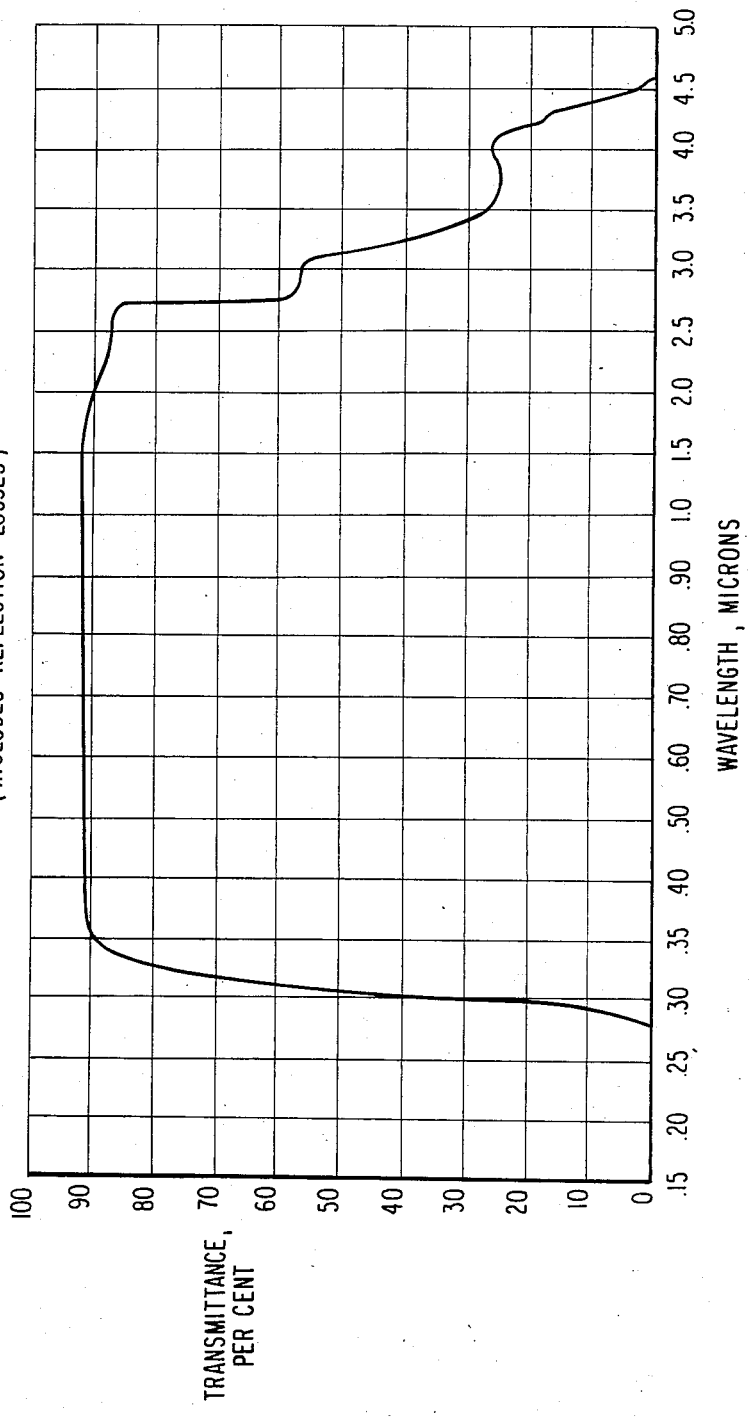
FIG. 2 is a graph showing a typical light transmissivity characteristic of the glass used in light valve projectors as a function of wavelength.
Figure 3:
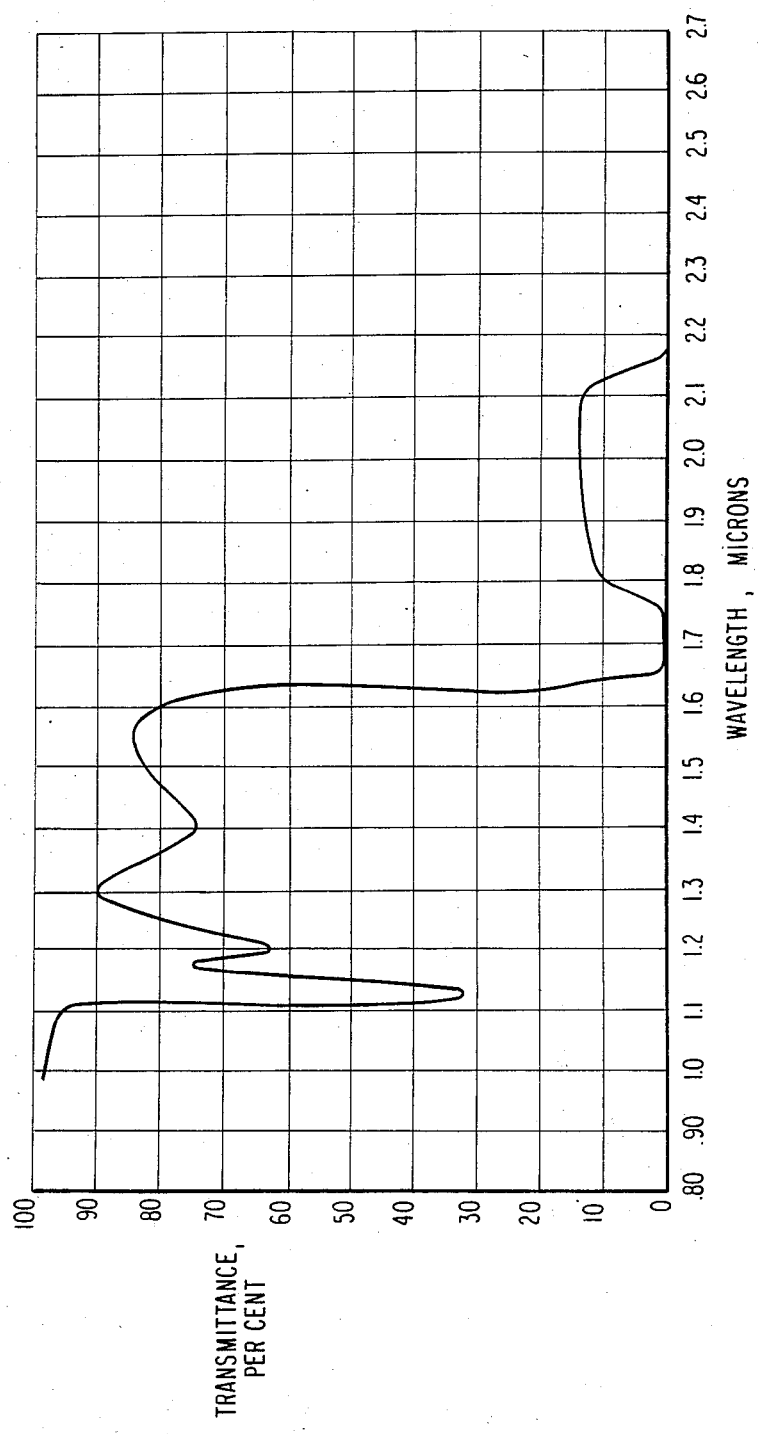
FIG. 3 is a graph showing a typical light transmissivity characteristic of light modulating fluids used in light valve projectors as a function of wavelength.

My tests showed that the faceplate 34 and the rear housing 35 glass transmit well in the relatively near infra-red region. FIG. 2 shows a graph of a typical light transmissivity characteristic of the light valve glass as a function of wavelength. The transmission of the faceplate is substantially constant from about 0.35 microns to about 2.0 microns, at which point the transmission begins to decrease until the faceplate becomes substantially opaque to infra-red radiation at about 4.6 microns. My tests also showed that the light modulating fluid absorbs well in the region from about 1.0 microns to about 2.17 microns beyond which it becomes totally absorptive. FIG. 3 shows a graph of the typical light transmissivity, and inversely the absorption, characteristics of the light modulation fluid as a function of wavelength.

In the system according to my invention, the temperature of the light modulating fluid in the reservoir 24 is heated from an ambient temperature to an operating temperature of about 60° C.±0.5° C. and then maintained at the operating temperature by an infra-red source. In FIG. 1, a source of infra-red radiation is depicted as a bulb 36 which may be an infrared emitter or an incandescent lamp having a broad spectrum of light output. The bulb 36 is shown adjacent the rear housing 35 of the glass envelope proximate to the reservoir 24, but the bulb could be located adjacent the face plate 34 as indicated by the bulb 40. Alternatively, both bulbs 36 and 40 could be used to provide directed infra-red sources of radiation into the reservoir 24 from either side thereof as viewed in FIG. 1. It is also possible to use more than one bulb on one side or the other or both sides or along the edge of the reservoir in the vicinity of the joining of the face plate 34 with the rear housing 35 or a combination of these alternatives to achieve an optimum desired performance.

An optional filter 37 is shown between the bulb 36 and the light modulating fluid in reservoir 24. The filter passes only the desired portion of the light spectrum and blocks that in the visible spectrum. This filter thus blocks light which may interfere with the light valve projection system. A filter may not be required, however, depending on the radiation characteristics of the particular infra-red source or how well the radiation of that source is focused on the fluid in the reservoir 24.

Focussing of the infra-red energy radiated from a source or sources may be achieved by the use of reflectors, mirrors, lenses, or fiber optics. Alternatively, self-focussing infra-red sources may be used which do not require further focussing. An optional reflector 38, such as a parabolic reflector, is shown in FIG. 1 for directing the light towards a particular point in the fluid 24. If a reflector is found to be necessary in a particular application, the interior surface of the metal housing of the light valve projection system (not shown) could be polished to serve this function. A lens could, of course, also be used as indicated by lens 41 between bulb 40 and the reservoir 24 to provide focussing of the infra-red radiation. The lens in turn could be replaced by fiber optics.

Figure 4:
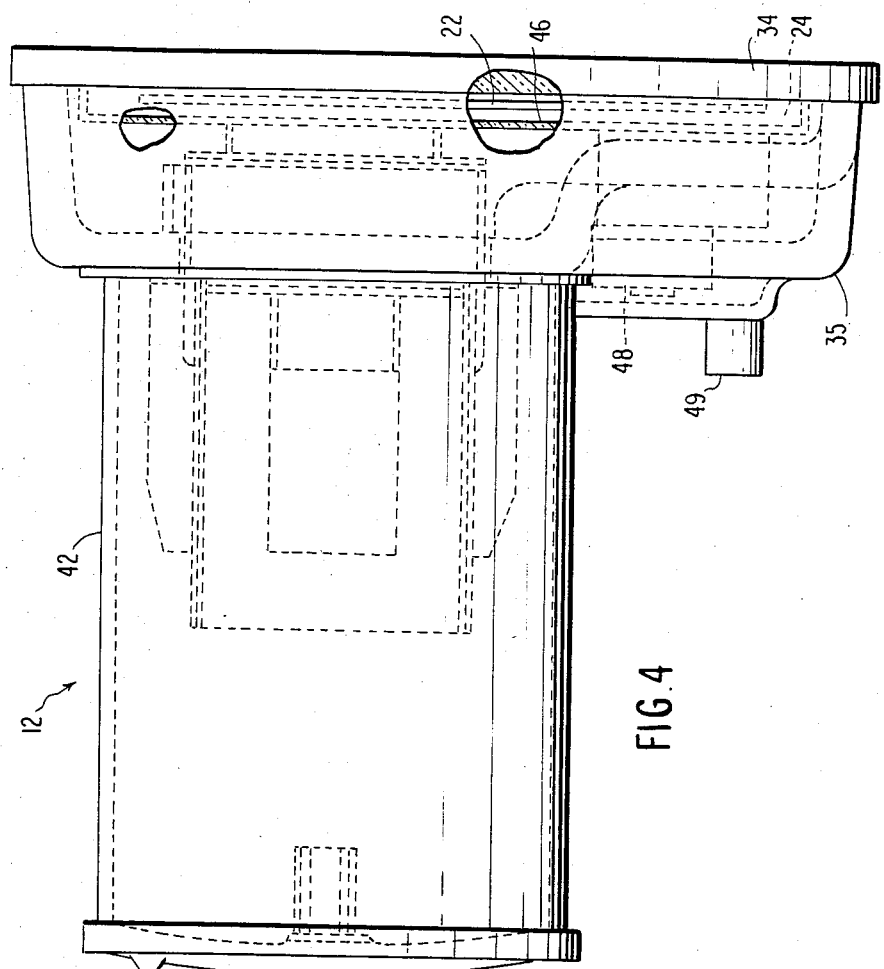
FIG. 4 is a plan view showing in more detail the contruction of a light valve used in the light valve projection system of FIG. 1.

FIG. 4 shows in more detail the plan view of a light valve 12. The light valve envelope includes a rear cylinder 42 at one end of which is the electron gun 16 centered in the end plate 44 and sealed to the rear cylinder 42 with a glass frit. At the other end, the rear cylinder is sealed to the rear housing 35 but eccentric therewith. The face plate 34 is sealed to the rear housing 35 to complete the light valve envelope.

The eccentric mounting of the rear cylinder to the rear housing forms the reservoir 24 for the light modulating fluid. The disk 22 rotates on the center line of the rear housing 35 and the face plate 34 assembly just behind the face plate within the envelope. In this way the disk 22 constantly rotates through the fluid in the reservoir 24 so that a control layer of fluid is deposited on the disk. Between the rotating disk 22 and the rear housing 35 is a baffle 46 which separates the reservoir 24 into two volumes in communication with one another. The volume between the baffle 46 and the rear housing 35 is pumped and filtered by the pump and filter assembly generally indicated at 48. Thus, the baffle 46 serves to isolate the fluid between it and the face plate 34 from the agitation caused by the pump and filter assembly 48 and keeps the fluid wetting the disk 22 in a relatively quiet state thereby promoting deposit of the control layer to a desired and even depth. The housing 49 attached to the rear housing 35 illustratively contains an infra-red light source according to the invention, but it will be understood by those skilled in the art that the infra-red source could be separately mounted within the housing (not shown) of the light valve projector system.

Figure 5:
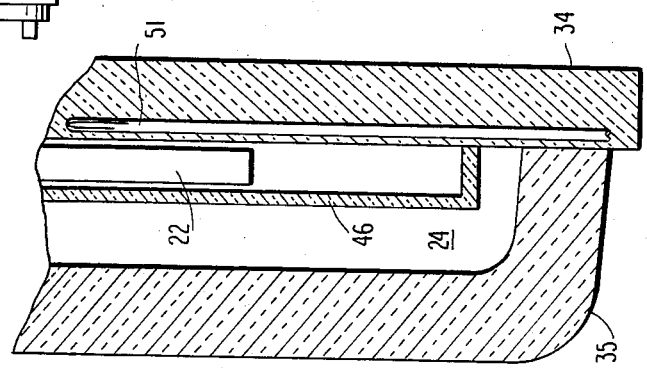
FIG. 5 is a detailed view of the reservoir portion of the light valve shown in FIG. 4 showing the location of a thermocouple to measure and monitor the heat of the light modulating fluid.

FIG. 5 shows an enlarged cross-sectional view of the reservoir 24 which shows but one possible placement of a thermocouple 51 for measuring and monitoring the temperature of the light modulating fluid. In this case, the thermocouple 51 is actually embedded in the face plate 34 just beneath the surface immediately adjacent the rotating disk 22. This provides a good direct measure of the temperature of the light modulating fluid in the reservoir 24 without introducing a possible contaminent into the fluid. There are, of course, many other locations where thermocouples could be located for this purpose and, depending on the needs of a specific application, more than one thermocouple could be used. Typically, the output of the thermocouple 51 would be monitored and power to the infra-red source regulated as required to achieve and maintain the desired operating temperature. A similar procedure would be followed in case it is necessary to change the operating temperature. Obviously, this could be accomplished by a simple feedback circuit with an adjustable reference.

While the invention has been described in terms of preferred embodiments, those skilled in the art will recognize that changes and modifications can be made without departing from the spirit and scope of the invention as defined in the appended claims. For example, those skilled in the art will recognize that other heating methods may be used in conjunction with the infra-red heating according to the invention. One such possiblity would be to use infra-red heating to achieve rapid heat-up of the fluid to its operating temperature and then maintaining the temperature of the fluid by means of other heating elements such as the flexible mat electric resistance heaters as used in the prior art. In addition, while the invention has been described as applied to a color light valve system, it should be understood that the invention is equally applicable to black and white or monochrome light valve systems.

Having thus described my invention, what I claim as new and desire to secure by Letters Patent is as follows:

1. A light valve projector system in which information is impressed on a light modulating fluid overlying a disk wherein incident visible light is modulated by the information and projected onto a viewing screen, said disk rotating within a glass envelope which forms a reservoir for said light modulating fluid through which said disk rotates in order to deposit a control layer of said fluid on said disk, the control layer being rotated to a raster area within which the information is written by the deposition of electric charge along scanning lines so as to form orthogonally related diffraction gratings, and infra-red heating means external to said envelope and positioned adjacent said reservoir for heating said fluid, wherein said heating means provides radiation at wavelengths which are transmitted through said envelope without producing thermal stress in said envelope and at wavelengths which heat said light modulating fluid to control the viscosity and light transfer characteristic thereof.

2. The light valve projector system recited in claim 1 further including a means for focussing infra-red radiation from said infra-red heating means upon said light modulating fluid.

3. The light valve projector system recited in claim 2 wherein said means for focussing is a reflector located adjacent to the infra-red radiation heating means.

4. The light valve projector system recited in claim 2 wherein said means for focusing is a lens located adjacent to said infra-red radiation heating means.

5. The light valve projector system recited in claim 1 wherein said infra-red heating means comprises a plurality of sources located so as to provide more uniform heating of said light modulating fluid.

6. The light valve projector system recited in claim 1 wherein said infra-red heating means comprises at least one incandescent lamp.

7. The light valve projector system recited in claim 1 wherein said infra-red heating means comprises a source of light having a broad spectrum and a means for filtering out visible light from said source.

8. The light valve projector system recited in claim 1 further comprising means for measuring the temperature of the fluid in said reservoir.

9. The light valve projector system recited in claim 1 wherein the wavelengths of said infra-red heating means encompass the wavelengths transmitted through the envelope above about 1.0 microns.

10. The light valve projector system recited in claim 9 wherein said light modulating fluid has a temperature of about 60° C.

* * * * *